United States Patent [19]

Thurlow

[11] Patent Number: 4,494,274

[45] Date of Patent: Jan. 22, 1985

[54] COOKWARE WITH COVERS HAVING METAL HANDLES

[76] Inventor: Heida L. Thurlow, 10814 Riverview, Houston, Tex. 77042

[21] Appl. No.: 447,740

[22] Filed: Dec. 8, 1982

[30] Foreign Application Priority Data

May 28, 1982 [DE] Fed. Rep. of Germany ....... 3220156

[51] Int. Cl.³ .............................................. B65D 25/28
[52] U.S. Cl. ..................................... 16/110 A; 16/124
[58] Field of Search .............. 16/110 A, 116 R, 110.5, 16/119, 127, 105, 125, 124; 126/390; 220/85 CH, 85 D, 94 R; 294/12, 149; D8/310, 313, 307

[56] References Cited

U.S. PATENT DOCUMENTS 268,323  3/1883  Schaumloffel ................. D8/307 X
998,557  7/1911  Selleck ................................. 16/127

FOREIGN PATENT DOCUMENTS 0501796  3/1951  Belgium ......................... 220/85 CH
0591504  1/1934  Fed. Rep. of Germany ........ 220/85 CH
0665161  9/1983  Fed. Rep. of Germany ........ 220/85 CH
0607077  3/1926  France .............................. 16/110 A Primary Examiner—Fred A. Silverberg
Attorney, Agent, or Firm—Davis, Hoxie, Faithfull & Hapgood

[57] ABSTRACT

A cooking and frying utensil includes a utensil structure and a utensil cover. A cover holder is adapted to be attached to the utensil cover and a ring element is joined to the cover holder while a handle holder is adapted to be attached to the utensil structure and an elongated U-shaped metal handle element is joined to the handle holder. The cover and handle holders along with the ring and handle elements are made of metal and are constructed to conduct minimum heat, whereby such parts may be readily handled in use.

5 Claims, 6 Drawing Figures

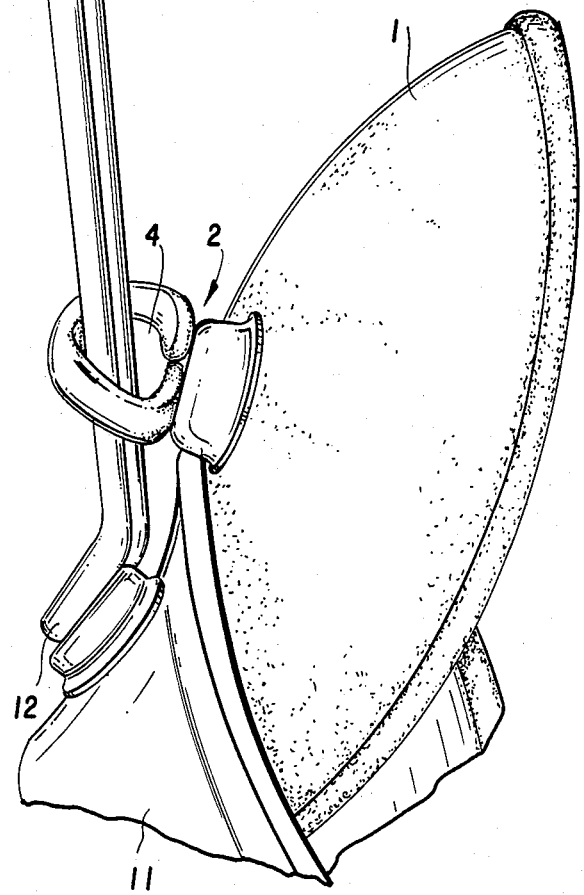
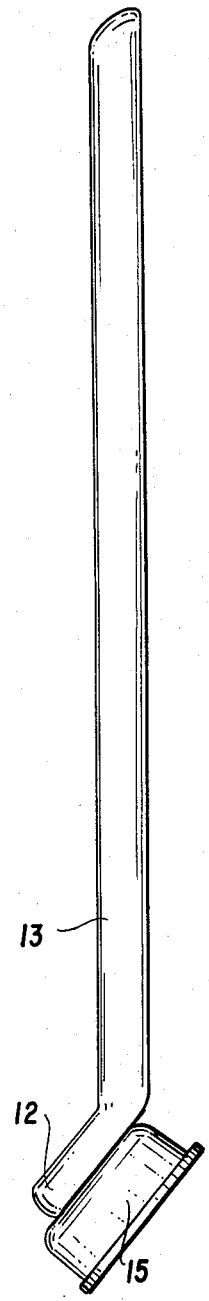

COOKWARE WITH COVERS HAVING METAL HANDLES

BACKGROUND OF THE INVENTION

The invention relates to a cooking and frying utensil with a cover, for instance, cooking and braising pots, casseroles, frying and sauteing pans or the like.

For these utensils and accompanying covers, handles of various shapes are used, for example, loop-shaped or U-shaped handles on pots and covers, stem-shaped handles on casseroles and frying pans or knob-shaped handles on covers. All these handle shapes, whether massive or hollow profile, have a relatively large cross-section or diameter, which has to be large enough for the U-shaped handles or knobs to be conveniently and securely held with the fingers and for the stem handles to rest comfortably and securely in the hand. However, this results in a rather large cross-sectional contact area between the handles and the utensils or covers.

In metal utensils and covers made, for example, of steel, refined steel or aluminium with welded or fastened handles as well as in utensils and covers made of ceramic materials or glass with massive handles made of the same material or with screwed on metal handles, the previously mentioned large cross-sectional contact area between the handle and utensil or cover and the excellent thermal conductivity of the aforementioned materials results in the handles getting too hot to touch without considerable risk of burning when heating the utensil on a stove. In order to be able to hold these handles, pot holders are necessary which no longer assures a secure grip of the handles.

Instead of handles of the previously mentioned kind, handles made of wood have often been used in the past. These, however, are adversely affected by moisture, for example, when doing dishes, and therefore, instead of these, handles made of synthetic materials have been used for a long time. The synthetic materials have low thermal conductivity but are easily broken, and the relatively thin-walled handle parts and screw threads to which the synthetic handles are attached on the utensil or the cover, can tear or break off. Furthermore, the synthetic materials can get brittle and fragile and may crack under the influence of high temperatures and frequent temperature changes, resulting in the breaking off of the handles. As a consequence of the relatively low hardness of the synthetic materials, the surface of the handles quickly can become dull and unattractive. Higher and higher demands are placed on the design and the decor of cooking and frying utensils. The particularly sensitive edges of utensils and covers of glass and ceramic materials therefore often have a thin border of refined steel, not only for protection against chipped edges but for aesthetic reasons as well.

It is the object of the invention to provide cooking and frying utensils with covers, having metal handles, particularly refined steel handles, which combine the aforementioned advantages of metal and synthetic handles, from a technical as well as an aesthetic viewpoint and, which at the same time, avoid the aforementioned disadvantages of the metal and the synthetic handles. It is thus an object of the invention to provide utensils with covers, having metal handles, which are durable, unbreakable, scratch resistant and dishwasher safe, having a durable, reliable and strong means of attachment, and satisfying the requirements as to convenient and secure handling, which do not get so hot that they can no longer be held with the hand, and which at the same time meet the increasing demands as to design and decor.

BRIEF DESCRIPTION OF THE DRAWINGS

FIG. 5 shows a side view of the intensil handle of FIG. 6, and FIG. 6 shows a utensil and a cover with handles, according to FIGS. 1 to 5.

DESCRIPTION OF THE PREFERRED EMBODIMENTS

Figure 1:
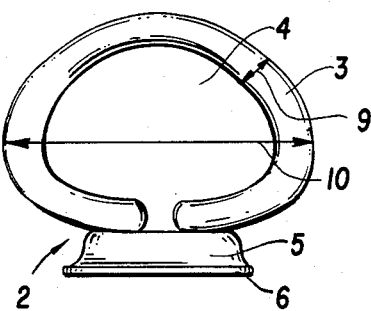
FIG. 1 shows a front elevation of the cover handle.
Figure 2:
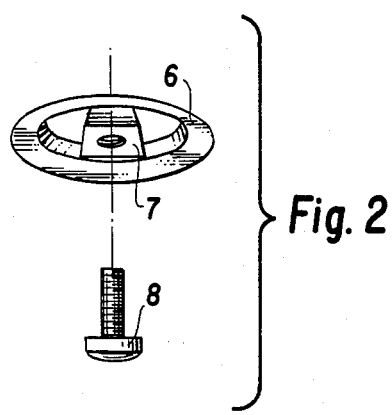
FIG. 2 shows a bottom view of the rim of the cover handle and also the screw.

Cover handle 2 in FIGS. 1 and 2 has a hand grip part 3 and an attachment part 5. Attachment part 5 consists of a bonnet or bell-shaped thin-walled metal hollow body, made of refined steel. The shape of the thin-walled hollow body gives the attachment part 5 high bending strength and structural stability, while, at the same time, the attachment part has contact with the cover only at the thin edge 6 (FIG. 2) of its opening. Thus, a bending resistant connection or attachment of attachment part 5 to the cover is established corresponding to the relatively large diameter of edge 6. On the other hand, however, a minimal contact area is created, resulting in minimal transfer of heat from the cover to the attachment part 5, and while the thin wall of the attachment part 5 enables only minimal transmittance of heat, strong heat radiation and cooling is produced by its large surface. Thus, low thermal conductivity of attachment part 5 and minimal heat flow from the heated cover via attachment part 5 to hand grip part 3 is achieved. A thin-walled nut 7 is attached inside attachment part 5 and handle 2 can thus be screwed onto the cover by screw 8 which is placed through a hole in the cover from below. The bridge formed by these attachment means is a poor thermal conductor and only relatively minimal heat can be transferred from the cover to the attachment part 5. Hand grip part 3 consists of a metal profile, made of refined steel, curved like a loop and attached with its ends to the outside of attachment part 5, forming an opening 4 in such a way that the cross-section of the metal profile indicated at 9 represents only a fraction of the total cross-section of hand grip part 3 as indicated at 10. Thus, a hand grip part 3 is produced, which, whether being a massive knob for a cover or a U-shaped handle for a pot, has the required total cross-section, assuring a convenient and secured holding of the pots, and, which, at the same time, has a relatively low metal cross-section of the metal profile, having instead a relatively large surface and radiation area. The already minimal amount of heat, which is transmitted via attachment part 5 to hand grip part 3, is therefore not stored in this, thus producing no heat but the heat is radiated off so easily and extensively that hand grip part 3 is not heated to an untolerable level. In this way, a metal handle with all its above-mentioned technical and aesthetic advantages is produced while avoiding the initially described heating of such handles.

Figure 3:
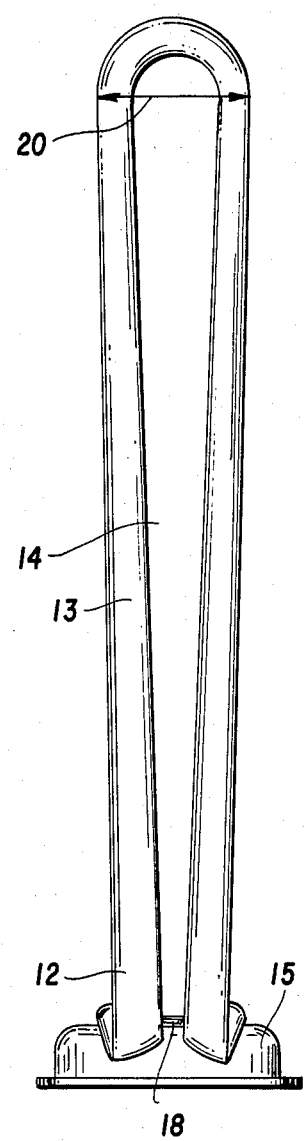
FIG. 3 shows a top view of the intensil handle of FIG. 6 which has been turned approximately 180°.
Figure 4:
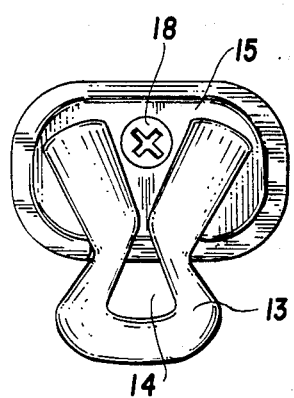

Handle 12 depicted in the example in FIGS. 3 to 5 is used for pots, pans and similar utensils and has an attachment part 15 which by and large corresponds with the previously described attachment part 5 in the example in FIGS. 1 and 2. The bonnet or bell-shaped hollow body of attachment part 15, however, has a longitudinal shape with an oval cross-section (FIG. 4) instead of a round shape with circular cross-section, and the attachment to the utensil is accomplished in standard fashion by a screw 18 (FIG. 4), which is placed through an opening in attachment part 15 and screwed into a screw thread on the utensil. Hand grip part 13 attached to attachment part 15 with its angled off ends forms a stem with a longitudinal opening 14 by means of its loop-shaped curved metal profile. This handle part otherwise corresponds with the example in FIGS. 1 and 2, and the mode of action is the same as in the previous example.

The invention (FIGS. 1,3,6) shows the cross-section of the circular or semi-circular opening 4 in hand grip part 3 of cover handle 2 to be larger than the total cross-section 20 of the stem or tuning-fork shaped hand grip part 13, having a longitudinal opening, of utensil handle 12. Utensil handle 12 with its hand grip part 13 can thus be put through opening 4 into hand grip part 3 of cover handle 2 meeting the often expressed demand for easy and effortless hanging of pretty, decorative utensils. FIG. 6 shows utensil 11, which can be a pan or a pot, hung on the wall by means of opening 14 in hand grip part 13 of its refined steel handle 12. The glass cover 1, which has a refined steel edge, is placed via opening 4 in hand grip part 3 of its refined steel handle 2 over utensil handle 12.

I claim:

1. A cooking and frying utensil comprising a utensil structure and a utensil cover, a cover holder, first attachment means attaching said cover holder to said utensil cover, said cover holder comprising a first hollow dished-out thin-walled metal hollow body providing an enlarged surface area for facilitating cooling of said first hollow body by the surrounding atmosphere, said first hollow body having an inside surface and an outside surface, said first hollow body also having a first rim held abuttingly against said utensil cover by said first attachment means, a metal ring element joined to said outside surface of said first hollow body, said ring element having an outer wall and an inner wall, said ring element having a central opening bounded by said inner wall, a handle holder, second attachment means attaching said handle holder to said utensil structure, said handle holder comprising a second hollow dished-out thin-walled metal hollow body providing an enlarged surface area for facilitating cooling of said second hollow body by the surrounding atmosphere, said second hollow body having an inside surface and an outside surface, said second hollow body also having a second rim held abuttingly against said utensil structure by said second attachment means, and a metal handle element joined to said outside surface of said handle holder, said handle element being of an elongated U-shaped configuration having two spaced legs, said handle element being constructed to have an overall width less than that of said central opening of said ring element such that said utensil cover is supportable on said utensil structure by sliding said ring element onto said handle element.

2. A cooling and frying utensil according to claim 1 further comprising a boss disposed within said first hollow body, said boss having a first and a second portion, said first portion being attached to said inner surface of said first hollow body and said second portion being spaced from said inner surface of said first hollow body whereby heat transfer from said boss to said first hollow body is minimized, said boss having an internal thread for threadedly receiving said first attachment means.

3. A cooking and frying utensil according to claim 1, wherein said ring element has two ends spaced from one another, said ring element having end portions immediately adjacent to said two ends, said end portions being joined to said outside surface of said first hollow body.

4. A cooking and frying utensil according to claim 1, wherein each of said two legs of said handle element has a main portion and an end portion, each end portion of said two legs being approximately perpendicular to the respective main portion, each end portion of said two legs being spaced from one another and being joined to said outside surface of said second hollow body.

5. A cooking and frying utensil comprising a utensil structure and a utensil cover, a cover holder, first attachment means attaching said cover holder to said utensil cover, said cover holder comprising a first hollow dished-out thin-walled metal hollow body providing an enlarged surface area for facilitating cooling of said hollow body by the surrounding atmosphere, said first hollow body having an inside surface and an outside surface, said first hollow body also having a first rim held abuttingly against said utensil cover by said first attachment means, a boss disposed within said first hollow body, said boss having a first and a second portion, said first portion being attached to said inner surface of said first hollow body and said second portion being spaced from said inner surface of said first hollow body whereby heat transfer from said boss to said first hollow body is minimized, said boss having an internal thread for threadedly receiving said first attachment means, a metal ring element, said ring element having two ends spaced from one another, said ring element having end portions immediately adjacent to said two ends, said end portions being joined to said outside surface of said first hollow body, said ring element having an outer wall and an inner wall, said ring element having a central opening defined by said inner wall, a handle holder, second attachment means attaching said handle holder to said utensil structure, said handle holder comprising a second hollow dished-out thin-walled metal hollow body providing an enlarged surface area for facilitating cooling of said second hollow body by the surrounding atmosphere, said second hollow body having an inside surface and an outside surface, said second hollow body also having a second rim held abuttingly against said utensil structure by said second attachment means, and a metal handle element joined to said handle holder, said handle element being of a elongated U-shaped configuration having two spaced legs, each of said two legs of said handle element having a main portion and an end portion, each end portion of said two legs being approximately perpendicular to the respective main portion, each end portion of said two legs being spaced from one another and being joined to said outside surface of said second hollow body, said handle element being constructed to have an overall width less than that of said central opening of said ring element such that said utensil cover is supportable on said utensil structure by sliding said ring element onto said handle element.

* * * * *